(12) United States Patent
Shapiro

(10) Patent No.: US 9,824,689 B1
(45) Date of Patent: Nov. 21, 2017

(54) SPEECH RECOGNITION FOR AVIONIC SYSTEMS

(71) Applicant: Rockwell Collins, Inc., Cedar Rapids, IA (US)

(72) Inventor: Geoffrey A. Shapiro, Cedar Rapids, IA (US)

(73) Assignee: Rockwell Collins Inc., Cedar Rapids, IA (US)

( * ) Notice: Subject to any disclaimer, the term of this patent is extended or adjusted under 35 U.S.C. 154(b) by 0 days.

(21) Appl. No.: 14/961,536

(22) Filed: Dec. 7, 2015

(51) Int. Cl.
  *G10L 21/00* (2013.01)
  *G10L 25/00* (2013.01)
  *G10L 15/22* (2006.01)

(52) U.S. Cl.
  CPC ........ *G10L 15/22* (2013.01); *G10L 2015/223* (2013.01); *G10L 2015/225* (2013.01)

(58) Field of Classification Search
  CPC ........ G10L 15/22; G10L 21/06; G06F 15/00; G10L 15/02; G06F 3/167; G06F 3/0482; G06F 3/011; H04N 21/42203; H04M 2201/42; H04M 2201/40; H04M 2250/74; A63F 2300/1081; F25D 2400/361; G06K 9/00597
  USPC .............................. 704/270, 270.1, 275, 277
  See application file for complete search history.

(56) References Cited

U.S. PATENT DOCUMENTS

| | | | |
|---|---|---|---|
| 4,725,959 A | 2/1988 | Nagata | |
| 5,818,423 A | 10/1998 | Pugliese et al. | |
| 5,926,790 A | 7/1999 | Wright | |
| 5,974,384 A | 10/1999 | Yasuda | |
| 6,173,192 B1 | 1/2001 | Clark | |
| 6,739,556 B1 * | 5/2004 | Langston | ........... B64D 45/0015 244/189 |
| 6,895,380 B2 * | 5/2005 | Sepe, Jr. | ................. G10L 15/22 701/23 |
| 7,089,108 B2 | 8/2006 | Merritt | |
| 7,174,300 B2 | 2/2007 | Bush | |
| 7,415,326 B2 | 8/2008 | Komer et al. | |
| 7,580,377 B2 | 8/2009 | Judd | |
| 7,606,715 B1 | 10/2009 | Krenz | |
| 7,809,405 B1 | 10/2010 | Rand et al. | |
| 7,881,832 B2 | 2/2011 | Komer et al. | |
| 7,912,592 B2 | 3/2011 | Komer et al. | |
| 8,139,025 B1 | 3/2012 | Krenz | |

(Continued)

OTHER PUBLICATIONS

U.S. Appl. No. 13/248,814, filed Sep. 9, 2011, Barber.
U.S. Appl. No. 14/013,883, filed Aug. 29, 2013, Shapiro.
U.S. Appl. No. 14/038,249, filed Sep. 26, 2013, Shapiro et al.

*Primary Examiner* — Edgar Guerra-Erazo
(74) *Attorney, Agent, or Firm* — Angel N. Gerdzhikov; Donna P. Suchy; Daniel M. Barbieri

(57) ABSTRACT

Voice-operable avionic systems and methods supporting utilization of speech recognition to facilitate control of avionic systems are disclosed. Utilizing speech recognition to control avionic systems may help reduce the head-down time of the flight crew. Safety features may also be implemented to ensure safety-critical commands are carried out as intended when commands are received through speech recognition. In addition, voice-operable avionic systems configured in accordance with embodiments of the inventive concepts disclosed herein may be implemented in manners that can help reduce the complexity and cost associated with obtaining certifications from aviation authorities.

20 Claims, 6 Drawing Sheets

(56) References Cited

U.S. PATENT DOCUMENTS

| | | | |
|---|---|---|---|
| 8,180,503 B2* | 5/2012 | Estabrook | B64C 13/18 340/945 |
| 8,234,121 B1 | 7/2012 | Swearingen | |
| 8,296,141 B2 | 10/2012 | Gilbert et al. | |
| 8,311,827 B2 | 11/2012 | Hernandez et al. | |
| 8,316,298 B2* | 11/2012 | Conti | A63F 13/10 345/419 |
| 8,370,157 B2* | 2/2013 | Boregowda | G10L 15/063 704/226 |
| 8,374,732 B2 | 2/2013 | Vial | |
| 8,515,763 B2 | 8/2013 | Dong et al. | |
| 8,761,965 B2* | 6/2014 | Righi | B64D 45/0015 701/11 |
| 9,190,073 B2* | 11/2015 | Dong | G10L 15/22 |
| 2002/0107694 A1* | 8/2002 | Lerg | B60C 23/06 704/273 |
| 2003/0110028 A1 | 6/2003 | Bush | |
| 2004/0245409 A1* | 12/2004 | Cordina | B64D 45/0015 244/185 |
| 2005/0203700 A1 | 9/2005 | Merritt | |
| 2006/0015338 A1 | 1/2006 | Poussin | |
| 2006/0123027 A1 | 6/2006 | Kohlhammer et al. | |
| 2007/0288242 A1 | 12/2007 | Spengler et al. | |
| 2008/0065275 A1 | 3/2008 | Vizzini | |
| 2010/0030400 A1 | 2/2010 | Komer et al. | |
| 2011/0125503 A1* | 5/2011 | Dong | G10L 15/22 704/275 |
| 2012/0290298 A1 | 11/2012 | Ljolje et al. | |
| 2013/0060571 A1 | 3/2013 | Soemo et al. | |
| 2013/0197917 A1* | 8/2013 | Dong | G10L 15/22 704/275 |
| 2013/0275139 A1 | 10/2013 | Coleman | |
| 2015/0217870 A1* | 8/2015 | McCullough | G08G 5/0021 704/275 |
| 2016/0011853 A1* | 1/2016 | Rogers | G06F 3/167 704/275 |

\* cited by examiner

SPEECH RECOGNITION FOR AVIONIC SYSTEMS

BACKGROUND

Avionic systems are electronic systems used on airborne vehicles such as aircraft, artificial satellites, spacecraft and the like. Avionic systems may include communication systems, navigation systems, display systems, flight management systems, as well as various other types of systems onboard airborne vehicles.

Flight crews typically interface with avionic systems through controls and/or display panels provided on flight decks. The amount of information and control options provided on modern flight decks has increased in recent years. While this trend is empowering to the flight crew, accessing the information and the control options provided on the flight deck may require the flight crew to look down and away from their usual viewpoints frequently and for long durations, creating a problem known as the "head-down time" problem.

SUMMARY

In one aspect, embodiments of the inventive concepts disclosed herein are directed to a system. The system may include an audio device configured to receive an audio input from a user. The system may also include a speech recognition processor in communication with the audio device. The speech recognition processor may be configured to recognize at least one voice command from the audio input. The system may also include an electronic device separated from the speech recognition processor and in communication with the speech recognition processor. The electronic device may be configured to: determine whether the at least one voice command is valid; and process the at least one voice command when the at least one voice command is determined to be valid.

In a further aspect, embodiments of the inventive concepts disclosed herein are directed to a method. The method may include: receiving an audio input from a user; processing the audio input to recognize at least one voice command from the audio input; determining whether the at least one voice command is valid; processing the at least one voice command when the at least one voice command is determined to be valid, further comprising: determining whether the at least one voice command includes a safety-critical command; presenting a preview of the at least one voice command when the at least one voice command includes a safety-critical command; and executing the at least one voice command only after receiving an explicit confirmation from the user when the at least one voice command includes a safety-critical command.

In another aspect, embodiments of the inventive concepts disclosed herein are directed to a system. The system may include an audio device configured to receive an audio input from a user. The system may also include a speech recognition processor in communication with the audio device. The speech recognition processor may be configured to recognize at least one voice command from the audio input. The system may also include an avionic system separated from the speech recognition processor and in communication with the speech recognition processor. The avionic system may be configured to: determine whether the at least one voice command is valid; determine whether the at least one voice command includes a safety-critical command; present a preview of the at least one voice command when the at least one voice command is valid and includes a safety-critical command; execute the at least one voice command only after receiving an explicit confirmation from the user when the at least one voice command is valid and includes a safety-critical command; and execute the at least one voice command immediately when the at least one voice command is valid and does not include a safety-critical command.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to voice-operable avionic systems that support utilization of speech recognition to facilitate control of avionic systems. Utilizing speech recognition to control avionic systems may help reduce the head-down time of the flight crew. Safety features may also be implemented to ensure safety-critical commands are carried out as intended when commands are received through speech recognition. In addition, voice-operable avionic systems configured in accordance with embodiments of the inventive concepts disclosed herein may be implemented in manners that can help reduce the complexity and cost associated with obtaining certifications from aviation authorities, which may be appreciated for various reasons.

Figure 1:
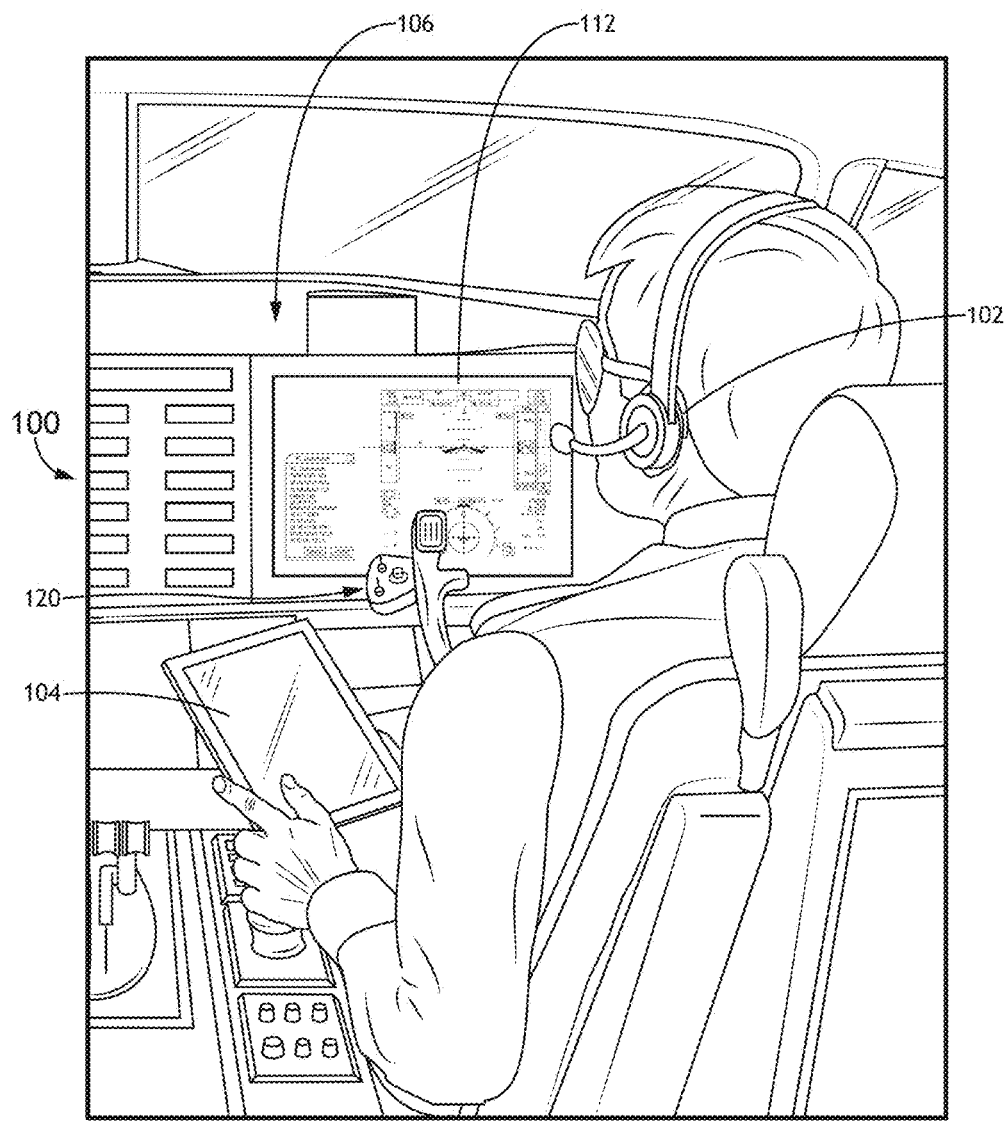
FIG. 1 is an illustration depicting a voice-operable avionic system according to an exemplary embodiment of the inventive concepts disclosed herein.
Figure 2:
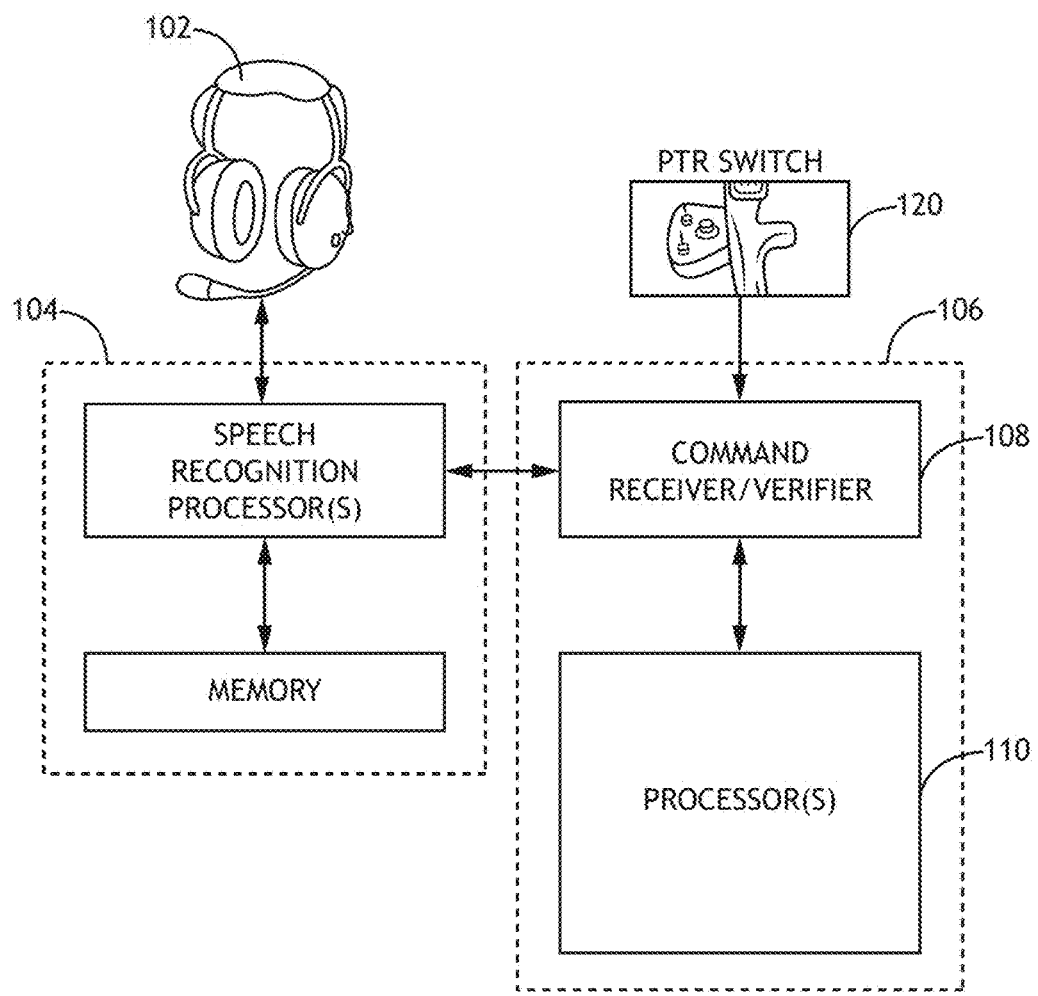
FIG. 2 is a block diagram depicting a voice-operable avionic system according to an exemplary embodiment of the inventive concepts disclosed herein.

Referring generally to FIGS. 1-2. FIG. 1 is an illustration depicting an exemplary voice-operable avionic system 100 configured in accordance with an embodiment of the inventive concepts disclosed herein. FIG. 2 is a block diagram depicting the voice-operable avionic system 100 shown in FIG. 1. More specifically, the voice-operable avionic system 100 may include an audio device 102 (e.g., a microphone or a headphone) configured to receive an audio input from a user (e.g., a pilot or a crew member). The audio input may be provided to a speech recognition processor 104 configured to process and recognize one or more voice command from the audio input. The speech recognition processor 104 may then provide the one or more voice command to one or more avionic system 106, which may perform certain operations based on the one or more voice command received.

It is contemplated that the speech recognition processor 104 may be utilized to facilitate control of a variety of avionic systems 106, including communication systems, navigation systems, display systems, flight management systems, as well as various other types of electronic systems onboard the aircraft. It is contemplated that the various systems onboard the aircraft may be implemented as an integrated system or a plurality of separate but interconnected systems. For purposes of presentation simplicity, however, a simplified avionic system 106 is illustrated to represent the various systems that can be controlled using speech recognition. It is to be understood that the descriptions of the avionic system 106 provided herein are merely exemplary and are not meant to be limiting.

As shown in FIGS. 1-2, the speech recognition processor 104 and the avionic system 106 may be implemented as separate components. The separation between the speech recognition processor 104 and the avionic system 106 may allow the speech recognition processor 104 and the avionic system 106 to be certified (e.g., by aviation authorities) independently. For instance, if the avionic system 106 has already been certified, it may not be necessary to re-certify the avionic system 106 when changes are made solely to the speech recognition processor 104. The separation may also allow the software and/or the hardware of the speech recognition processor 104 to be certified to a level that is different from the level required of the software and/or the hardware of the avionic system 106, which may help reduce the complexity and cost associated with obtaining certifications.

In some embodiments, the speech recognition processor 104 may be implemented as a portable computing device (e.g., a tablet device). Alternatively and/or additionally, the speech recognition processor 104 may be implemented as a stationary computing device, which may include dedicated processing devices, application-specific integrated circuits (ASICs), field-programmable gate arrays (FPGAs), or various other types of processors or processing devices onboard the aircraft. It is contemplated that the specific implementation of the speech recognition processor 104 may vary without departing from the broad scope of the inventive concepts disclosed herein.

The speech recognition processor 104 may communicate with the avionic system 106 via a wired or a wireless communication interface. The avionic system 106 may employ a set of rules designed to verify the voice command received from the speech recognition processor 104. This set of rules may be implemented in the forms of a software, hardware or firmware package, which may be referred to as a command verifier 108. The command verifier 108 may be configured to determine if any command received from the speech recognition processor 104 is invalid (e.g., based on the set of rules) and prevent invalid commands from flowing to the avionic system 106 for processing. A command may be deemed invalid if, for example, the command requests a modification to a flight plan when no modified route exists. In another example, if the user commands a function beyond its limits (e.g., setting the airspeed above its upper limit), that command may also be deemed invalid. In certain embodiments, if a voice command is deemed invalid, a rejection message may be issued (e.g., via a display 112 or an indicator on the flight deck) to inform the user. Alternatively and/or additionally, the user may be informed of the rejection via an audio signal through the audio device 102.

The command verifier 108 may be further configured to determine whether a received voice command is a safety-critical command, which is a command that affects the flight of the aircraft and/or its essential systems. If the command verifier 108 determines that a voice command is a safety-critical command, additional user confirmation may be required prior to the execution of that voice command. In other words, the command verifier 108 may prohibit any changes to the operations of the aircraft to be committed without receiving another explicit confirmation from the user. The requirement of an explicit confirmation from the user for safety-critical commands may help ensure that the safety-critical commands are carried out only as intended when voice commands are received from the speech recognition processor 104.

Figure 3:
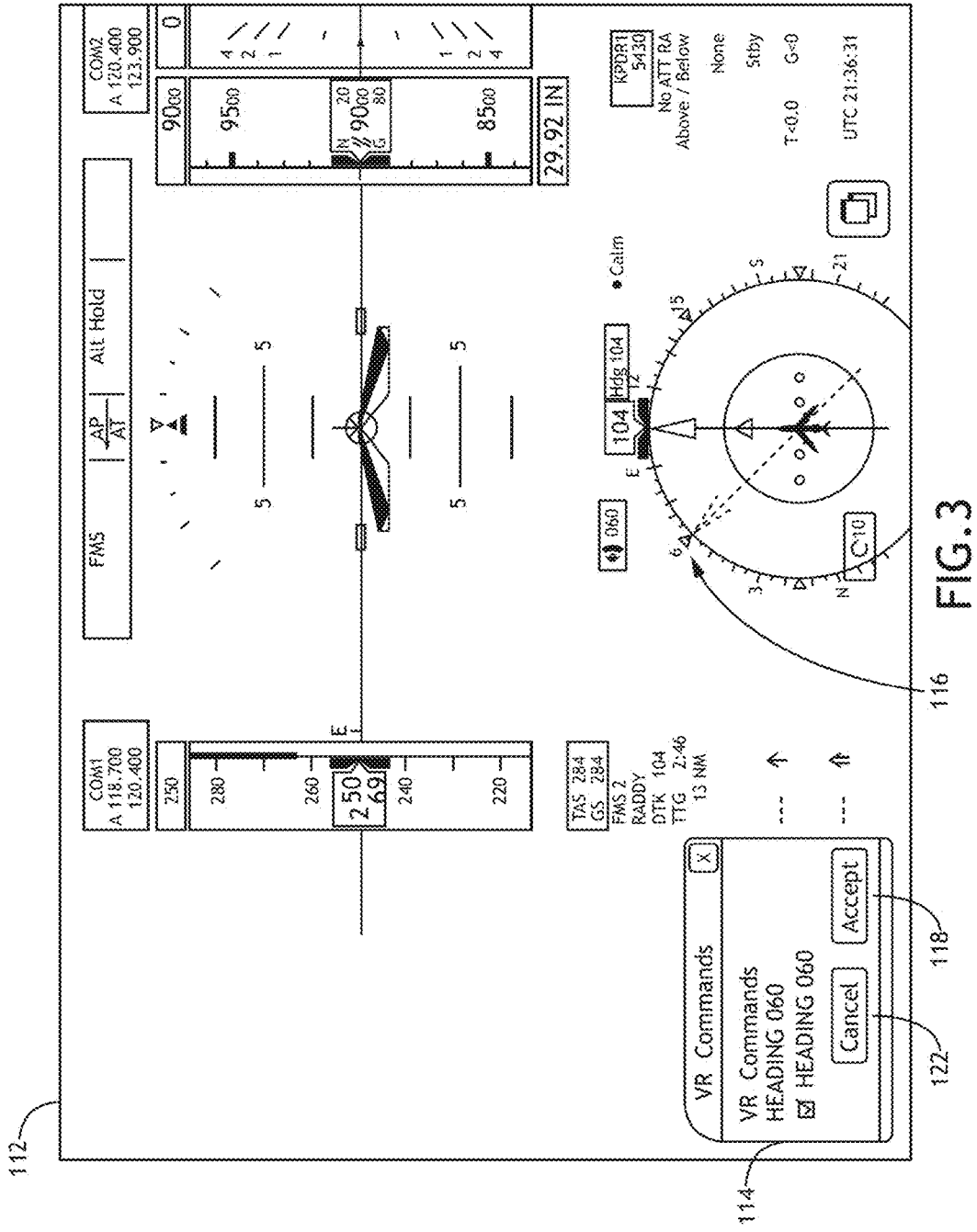
FIG. 3 is an illustration depicting a confirmation process for carrying out a safety-critical command according to an exemplary embodiment of the inventive concepts disclosed herein.

FIG. 3 is an illustration depicting an exemplary confirmation process for carrying out a safety-critical command. For illustrative purposes, suppose the voice command received from the speech recognition processor 104 indicates that the user wants to change the heading of the aircraft to 060. After verifying that this voice command is valid, the command verifier 108 may allow the voice command to flow to one or more processors 110 of the avionic system 106 for processing. However, the one or more processors 110 of the avionic system 106 may only be allowed to preload the heading change at this time because the voice command does affect the flight of the aircraft, meaning that the heading change cannot be committed without an explicit confirmation from the user.

To obtain the explicit confirmation from the user, the heading change needs to be presented to the user for approval. FIG. 3 depicts several options for presenting previews of the heading change to the user for approval. For example, the one or more processors 110 of the avionic system 106 may be in communication with a display 112 on the flight deck, in which case the one or more processors 110 of the avionic system 106 may prompt the display 112 to present a message box 114 that displays a text description of the voice command received. Additionally and/or alternatively, if the preview can be presented using a graphical representation, the one or more processors 110 of the avionic system 106 may prompt the display 112 to present such a graphical representation (e.g., a heading preview bug 116) in addition to (or instead of) the text description of the voice command. Further, the voice command may be presented back to the user as an audible read-back. For instance, the one or more processors 110 of the avionic system 106 may generate a synthetic read-back or an aural tone representing the voice command, which may be delivered to the user via the audio device 102, allowing the user to confirm the correctness of the voice command without having to change his/her viewpoint (further reducing head-down time).

It is to be understood that the various options for presenting the preview of the voice command are merely exemplary and are not meant to be limiting. It is contemplated that textural and/or graphical representations of different types of commands may vary without departing from the broad scope of the inventive concepts disclosed herein. It is also contemplated that other types of signals, including haptic signals, may be utilized for preview purposes as well without departing from the broad scope of the inventive concepts disclosed herein.

Regardless of the specific preview option(s) used by the user, the purpose of the preview is to provide the user an opportunity to verify the correctness of the voice command received and decide whether to accept or cancel the voice command. If the voice command is correct (e.g., correctly uttered by the user and correctly recognized by the speech recognition processor 104) and the user decides to carry out the voice command, the user may explicitly confirm the acceptance by performing a predetermined action (e.g., press the accept button 118 of the message box 114 or a button on a control stick 120). The one or more processors 110 of the avionic system 106 may then be allowed to commit the voice command as specified in the preview. On the other hand, if the user decides to cancel the voice command, the user may choose to perform another predetermined action (e.g., press the cancel button 122 of the message box 114) or simply ignore the preview, and after a configurable delay, the one or more processors 110 of the avionic system 106 may initiate a time-out and cancel the voice command accordingly.

It is noted that while requiring an explicit confirmation from the user may help ensure that safety-critical commands are carried out as intended, such a confirmation may not be necessary for non-safety-critical commands. Non-safety-critical commands may refer to commands that do not cause significant safety issues even if the commands are recognized and/or executed incorrectly. For example, the user may issue a voice command requesting a display of an instrument landing system (ILS) chart for a particular airport. Since displaying an ILS chart does not affect the fight of the aircraft, such a command may be deemed non-safety-critical. For a non-safety-critical command, the command verifier 108 may allow the command to flow to one or more processors 110 of the avionic system 106 for processing, and the one or more processors 110 of the avionic system 106 may execute the command immediately without additional user confirmation, allowing the requested ILS chart 120 to be displayed to the user as shown in FIG. 4.

Figure 4:
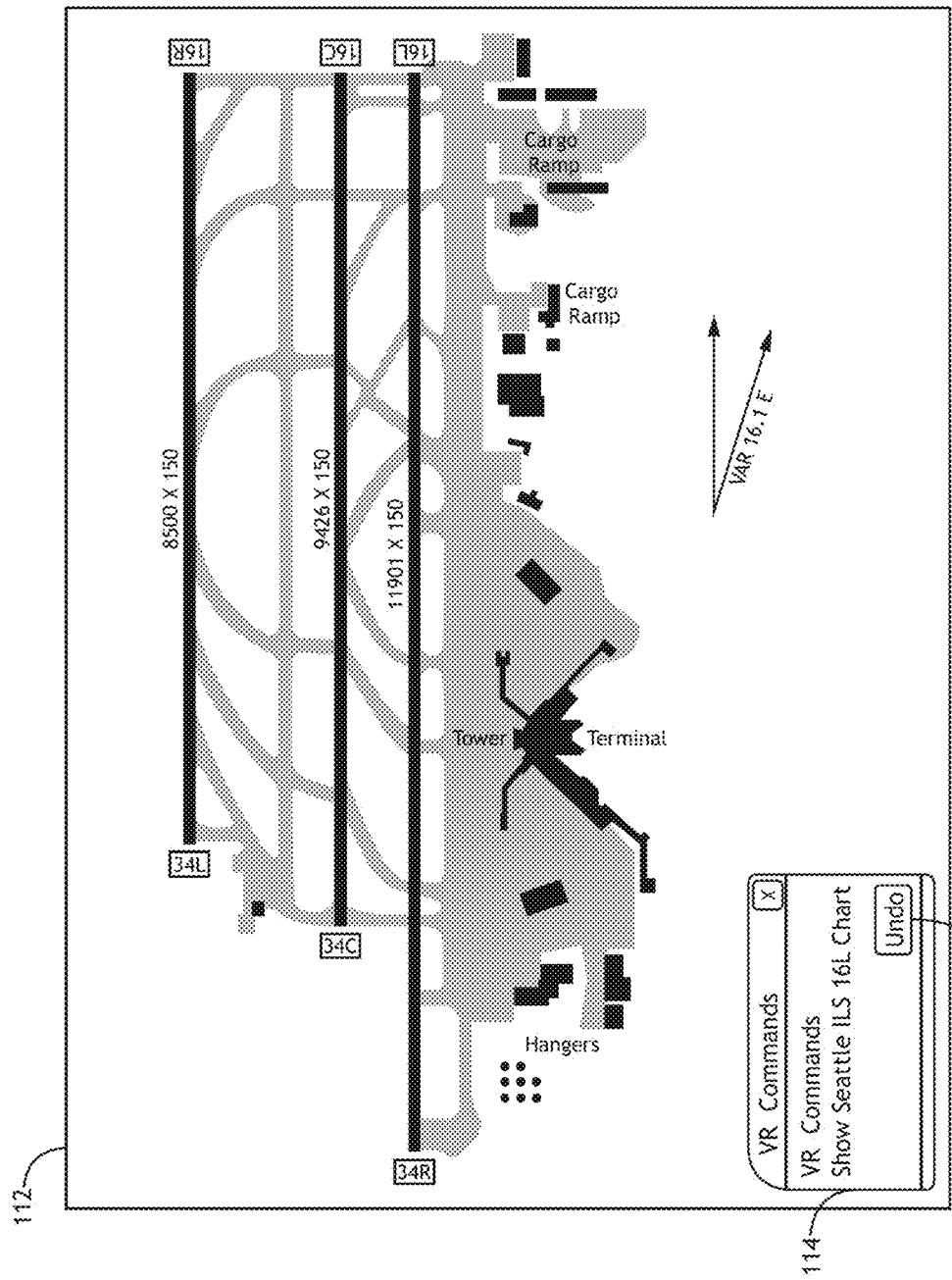
FIG. 4 is an illustration depicting processing of a non-safety-critical command according to an exemplary embodiment of the inventive concepts disclosed herein.

Also shown in FIG. 4 is a message box 114 that displays a text description of the voice command along with an undo button 124. The purpose of the undo button 124 is to provide the user an option to reverse the execution of the non-safety-critical command just performed (e.g., if the command was incorrectly uttered by the user or incorrectly recognized by the speech recognition processor 104). It is to be understood that the undo button 124 shown in FIG. 4 is merely exemplary and is not meant to be limiting. It is contemplated that the user may be provided with other options (e.g., a hardware button or a predetermined voice-based undo command) to initiate the undo process without departing from the broad scope of the inventive concepts disclosed herein.

It is contemplated that the speech recognition processor 104 may be utilized as an alternative to hardware knobs or on-screen buttons to interface with the avionic system 106. It is contemplated that the speech recognition processor 104 may be configured to recognize a variety of commands, which may support functions including, but not limited to, control of the primary flight displays, control of the flight management systems, chart recalls, radio tuning, format changes, checklist entries, switch controls, aircraft systems control, menu controls, map display and the like. It is contemplated that various other types of functions may be supported without departing from the broad scope of the inventive concepts disclosed herein.

It is also contemplated that the speech recognition processor 104 may provide natural language processing abilities. For example, the pilot may ask "what is the visibility in Cedar Rapids" or "can I land at Cedar Rapids", which may require the speech recognition processor 104 to correctly interpret the questions into executable command(s) for the avionic system 106 to process. It is contemplated that the responses may also be provided to the pilot using natural languages to support a conversation-style interface. For example, the avionic system 106 may respond to the pilot via the audio device 102 that "Cedar Rapids overcast 500 feet" or "Cedar Rapids visibility is below minimum."

It is further contemplated that the speech recognition processor 104 and/or the avionic system 106 may implement a variety of processes that may further enhance the user experience. In certain embodiments, the speech recognition processor 104 and/or the avionic system 106 may support contextual commands, which may infer meaning from a voice command using aircraft state data. An example of this type of voice command is "tune tower". If the aircraft is on the ground at a particular airport, the voice command "tune tower" may be recognized to mean tune to the frequency used by the tower at that particular airport. Similarly, if a pilot commands "tune weather" during the flight, the avionic system 106 may determine the current position of the aircraft and tune to the nearest weather station. In another example, a pilot may state "setup for approach", which may be recognized as a contextual command that in fact involves multiple sub-commands. More specifically, the command "setup for approach" may reconfigure the flight deck to show appropriate charts based on the current position of the aircraft, turn on/off certain map symbols and overlays, and reconfigure the format of the display 112 to the approach format. It is noted that support for contextual commands may be appreciated in various situations. For instance, contextual commands do not require the user to look up the frequency, which may otherwise require several user actions. Contextual commands may also shorten the grammar, which may reduce the command time. In addition, since humans naturally infer context when speaking to each others, aligning with this paradigm may help reduce the chances of user interaction errors.

The speech recognition processor 104 and/or the avionic system 106 may also implement processes that are designed to resolve potential ambiguities. For example, the user may give a command that reads "tune 132.5" without specifying the specific radio and whether the radio should be active or standby after tuning. In such situations, command defaults may be established to help resolve the ambiguity. In the tuning example above, the avionic system 106 may be configured to always tune the active frequency of the last tuned radio unless otherwise stated by the user. It is noted that other types of command defaults may be established without departing from the broad scope of the inventive concepts disclosed herein.

It is also noted that certain ambiguities may require additional user input. For example, if the speech recognition processor 104 and/or the avionic system 106 are uncertain whether an audio input received from the user is recognized correctly, and suppose there are multiple potential matches for the audio input, the speech recognition processor 104 and/or the avionic system 106 may prompt the user to help resolve the ambiguity. In such cases, the potential matches may be ranked and presented to the user for his/her selection. In another example, if the speech recognition processor 104 and/or the avionic system 106 determine that additional information is needed to complete a command, the speech recognition processor 104 and/or the avionic system 106 may prompt the user to specify the information needed. For example, if the user issues a command "load Chicago ILS 09," the speech recognition processor 104 and/or the avionic system 106 may prompt the user to specify the category of approach, to which the user may respond "category 1," which may help resolve the ambiguity in the original command.

It is contemplated that the speech recognition processor 104 and/or the avionic system 106 may also be configured to accept multiple voice commands in a single utterance. The ability to support multiple voice commands in a single utterance may allow the user to speak naturally and may save time compared to multiple individual utterances. For example, the user may utter "turn left heading 210, climb and maintain 3000" in a single sentence. In another example, the user may utter "turn left heading 120, set speed 130, descend to 2000 at 1500, and tune to 122.5" all at once.

Figure 5:
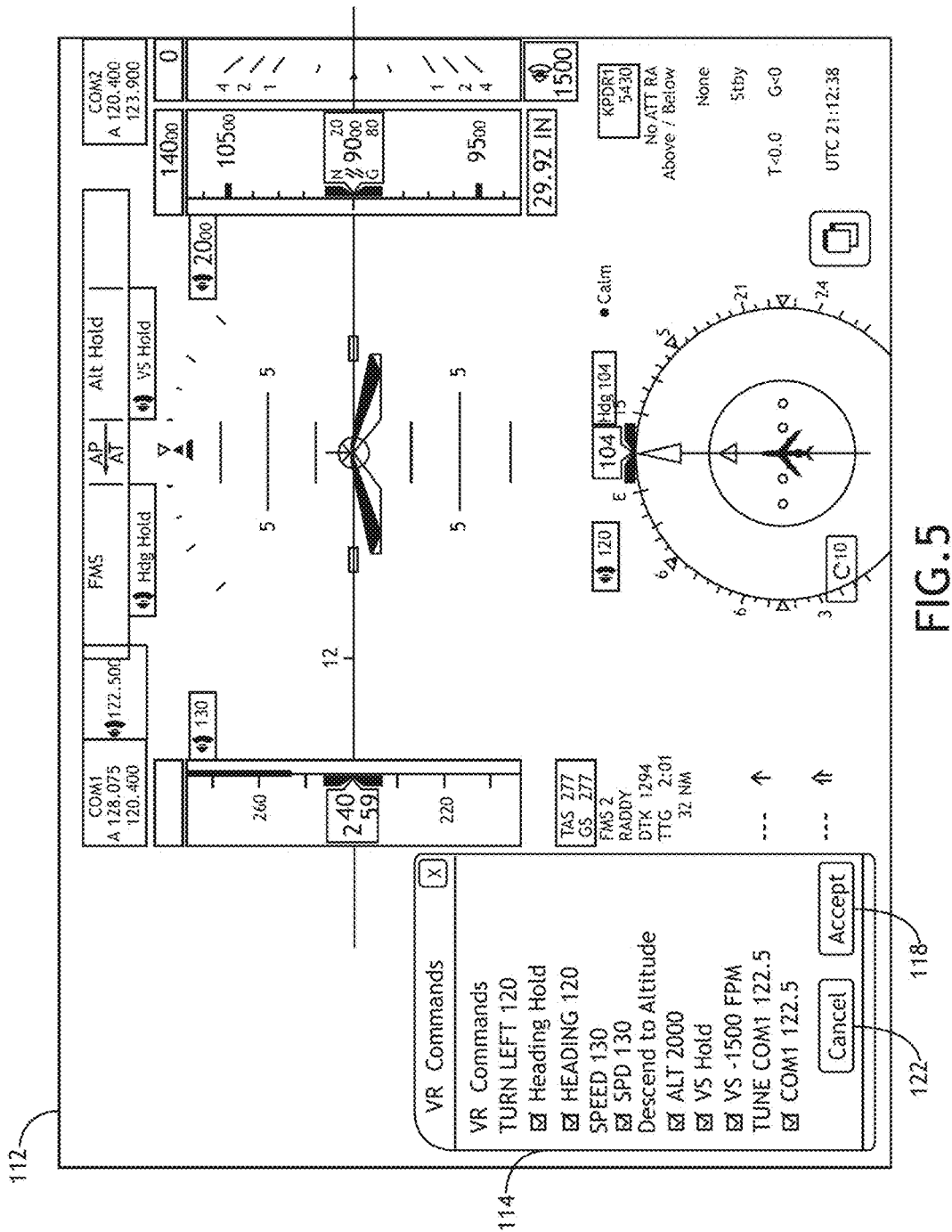
FIG. 5 is an illustration depicting another confirmation process according to an exemplary embodiment of the inventive concepts disclosed herein.

It is noted that if a mixture of safety-critical and non-safety-critical commands are spoken in one utterance, the command verifier 108 may treat them all as safety-critical commands and require the user to confirm the correctness of the recognized commands prior to execution. FIG. 5 is an illustration depicting a message box 114 containing a preview of multiple voice commands recognized from a single utterance "turn left heading 120, set speed 130, descend to 2000 at 1500, and tune to 122.5". It is noted that some commands (e.g., descend to 2000 at 1500), referred to as macro commands, may need to be split into several sub-commands for execution. In the event that one or more command is spoken, recognized, or interpreted incorrectly, the user may uncheck the incorrect command and confirm execution of the remainder of the correct commands. Alternatively, the user may cancel all commands listed in the message box 114 and reissue the voice commands again. In certain embodiments, the speech recognition processor 104 and/or the avionic system 106 may be configured to accept a mixture of correct and incorrect commands while allowing the user to verbally correct some of the commands without having to restate the entire command. For example, the user may state "turn left heading 120, set speed 130—correction 135—descend to 2000 at 1500, and tune to 122.5" The speech recognition processor 104 and/or the avionic system 106 may recognize the correction to the speed setting and proceed accordingly.

It is contemplated that the voice-operable avionic system 100 may allow the speech recognition processor 104 to be engaged in one or more different manners. For example, the voice-operable avionic system 100 may be configured to engage the speech recognition processor 104 when the user pushes and holds a push-to-talk button on a control stick 120. Alternatively and/or additionally, the speech recognition processor 104 may be voice activated. The speech recognition processor 104 may also be configured to monitor radio communications (e.g., listening for instructions from air traffic controllers addressed to the aircraft's tail number) and actively identify actionable voice commands from the radio communications. The speech recognition processor 104 may be further configured to listen to read-backs from the user to air traffic controllers. For instance, a push-to-talk radio button used to facilitate communications with air traffic controllers may support at least two positions: 1) speaking with air traffic controllers and bypassing the speech recognition processor 104, and 2) speaking with air traffic controllers and feeding the voice signals to the speech recognition processor 104. It is contemplated that the speech recognition processor 104 may be engaged in various other manners without departing from the broad scope of the inventive concepts disclosed herein.

The speech recognition processor 104 may also implement various techniques to improve its recognition accuracy. For instance, the speech recognition processor 104 may be configured to record at least some of the speech recognition data (e.g., including success and/or failure data) in one or more memory devices. The recorded data may be uploaded to a server when permitted, and the server may analyze the collected data to improve the performance of the speech recognition processor 104. Areas of improvements may include, for example, tolerance of accents, increase of vocabularies, knowledge of grammatical/command variations, as well as other improvements that may be accomplished through machine learning. It is contemplated that in certain instances, providing improvements may require software, firmware, and/or hardware updates of the speech recognition processor 104, which may be updated (and re-certified if needed) independently without changing the rest of the voice-operable avionic system 100.

The speech recognition processor 104 may also be equipped with acoustic filters to mitigate effects of ambient noises from various sources (e.g., engine, transmission, and/or wind noises). It is contemplated that the acoustic filters may be tailored for each particular aircraft type to further improve the effectiveness of the acoustic filters. For instance, characterization sound levels may be recorded during flight-testing phases of a particular aircraft type and used to develop and/or modify the acoustic filters for that particular aircraft type. It is to be understood, however, that whether to use acoustic filters, and how to configure the acoustic filters, may be determined based on user preferences and may vary without departing from the broad scope of the inventive concepts disclosed herein.

It is noted that utilizing the speech recognition processor 104 disclosed herein not only simplifies the control interface to the avionic system 106, but also helps to reduce the head-down time required of the user. Moreover, pilots flying hands on flight controls may see an increased benefit from speech recognition since issuing voice commands does not require the pilots to move their hands from the controls. It is also noted that while aircraft and aircraft-specific functions are referenced in the examples described above, the exemplary voice-operable avionic system 100 is not limited to applications in airborne vehicles. It is contemplated that the avionic system 106 referenced above may be referred to as an electronic device, which may be utilized stand-alone or onboard various types of vehicles, including airborne, land-based, and maritime vehicles, without departing from the broad scope of the inventive concepts disclosed herein.

Figure 6:
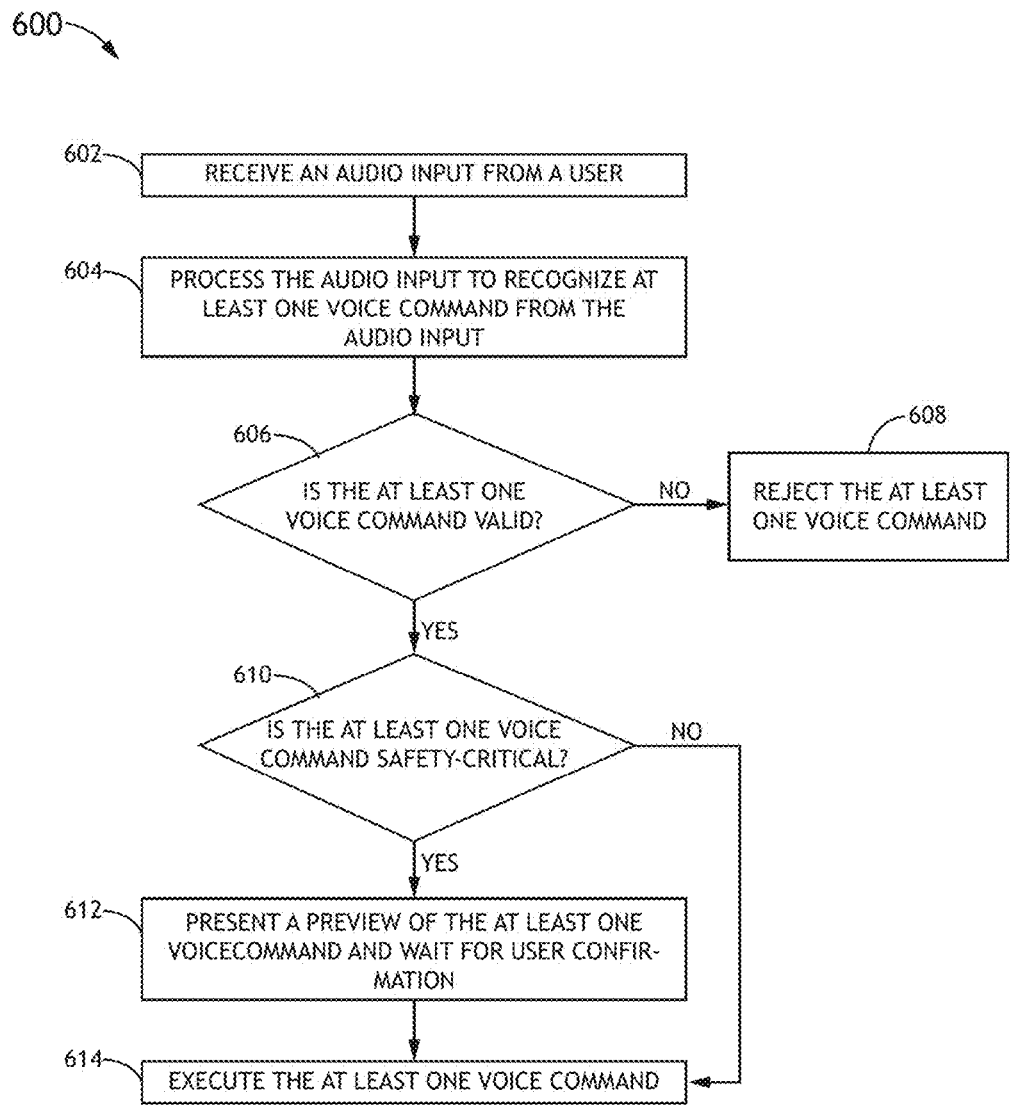
FIG. 6 is a flow diagram depicting a method for providing speech recognition based control of an avionic system according to an exemplary embodiment of the inventive concepts disclosed herein.

Referring now to FIG. 6, a flow diagram depicting an exemplary method 600 for controlling an avionic system is shown. More specifically, an audio input may be received from a user in a step 602. The audio input may be processed in a step 604 to recognize at least one voice command from the audio input. The recognized voice command may be provided to the avionic system, which may determine whether the voice command is valid or not in a step 606. If the voice command is determined to be invalid, the voice command may be rejected in a step 608. Otherwise, the voice command may be allowed to be process.

In some embodiments, a step 610 may be invoked to determine whether the voice command is a safety-critical command. If the voice command is determined to be a safety-critical command, a preview of the voice command may be presented in a step 612, and the voice command may be executed in a step 614 after receiving an explicit confirmation from the user. On the other hand, if the voice command is not a safety-critical command, the preview step 612 may be bypassed and the voice command may be executed immediately. It is contemplated that the user may be presented with options to cancel and/or reverse the execution of the voice command as previously described.

It is to be understood that embodiments of the inventive concepts disclosed herein may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that the specific order or hierarchy of steps in the processes disclosed is an example of exemplary approaches. It is to be understood that the specific order or hierarchy of steps in the processes may be rearranged while remaining within the broad scope of the inventive concepts disclosed herein. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A system, comprising:
  an audio device configured to receive an audio input from a user;
  a speech recognition processor in communication with the audio device, the speech recognition processor configured to recognize at least one voice command from the audio input; and
  an electronic device separated from the speech recognition processor and in communication with the speech recognition processor, the electronic device configured to:
    determine whether the at least one voice command is valid and includes a safety-critical command;
    present a preview of the at least one voice command when the at least one voice command includes a safety-critical command; and
    execute the at least one voice command only after receiving an explicit confirmation from the user when the at least one voice command includes a safety-critical command.

2. The system of claim 1, wherein the at least one voice command is determined to be valid based on a set of rules and the at least one voice command is determined to be invalid based on the at least one voice command containing a first value or a request that is above or beyond a second value or limit set by the set of rules.

3. The system of claim 1, wherein the preview of the at least one voice command includes an audible feedback to the user.

4. The system of claim 1, wherein at least one of the speech recognition processor and the electronic device is further configured to:
  cancel the at least one voice command when at least one of the following occurs:
    no explicit confirmation is received from the user within a configurable time period;
    a cancellation command is received; and
    a new audio input is received from the user.

5. The system of claim 1, wherein at least one of the speech recognition processor and the electronic device is further configured to:
  determine whether the at least one voice command includes a safety-critical command; and
  execute the at least one voice command immediately when the at least one voice command does not include a safety-critical command.

6. The system of claim 5, wherein at least one of the speech recognition processor and the electronic device is further configured to:
  provide the user an option to reverse the execution of the at least one voice command.

7. The system of claim 1, wherein at least one of the speech recognition processor and the electronic device is further configured to:
  reject the at least one voice command when the at least one voice command is determined to be invalid.

8. The system of claim 7, wherein the rejection of the at least one voice command is audible to the user.

9. The system of claim 1, wherein the electronic device is an avionic system located onboard an aircraft.

10. The system of claim 9, wherein the speech recognition processor and the avionic system maintain a separation that allows the speech recognition processor and the avionic system to be certified independently with respect to each other.

11. The system of claim 9, wherein the audio device is further configured to receive audio inputs by monitoring radio communications.

12. A method, comprising:
  receiving an audio input from a user;
  processing the audio input to recognize at least one voice command from the audio input;
  determining whether the at least one voice command is valid;
  processing the at least one voice command when the at least one voice command is determined to be valid, further comprising:
    determining whether the at least one voice command includes a safety-critical command;
    presenting a preview of the at least one voice command when the at least one voice command includes a safety-critical command; and executing the at least one voice command only after receiving an explicit confirmation from the user when the at least one voice command includes a safety-critical command.

13. The method of claim 12, wherein the processing of the at least one voice command further comprises:
canceling the at least one voice command if no explicit confirmation is received from the user within a configurable time period.

14. The method of claim 12, wherein the processing of the at least one voice command further comprises:
executing the at least one voice command immediately when the at least one voice command does not include a safety-critical command.

15. The method of claim 14, wherein the processing of the at least one voice command further comprises:
providing the user an option to reverse the execution of the at least one voice command.

16. The method of claim 12, further comprising:
rejecting the at least one voice command when the at least one voice command is determined to be invalid.

17. The method of claim 12, further comprising:
providing an audible feedback to the user regarding processing status of the at least one voice command.

18. The method of claim 12, further comprising:
collecting data regarding at least one of the audio input and the at least one voice command; and
analyzing the data collected to improve accuracy of recognition of the at least one voice command from the audio input.

19. A system, comprising:
an audio device configured to receive an audio input from a user;
a speech recognition processor in communication with the audio device, the speech recognition processor configured to recognize at least one voice command from the audio input; and
an avionic system separated from the speech recognition processor and in communication with the speech recognition processor, the avionic system configured to:
determine whether the at least one voice command is valid;
determine whether the at least one voice command includes a safety-critical command;
present a preview of the at least one voice command when the at least one voice command is valid and includes a safety-critical command;
execute the at least one voice command only after receiving an explicit confirmation from the user when the at least one voice command is valid and includes a safety-critical command; and
execute the at least one voice command immediately when the at least one voice command is valid and does not include a safety-critical command.

20. The system of claim 19, wherein the at least one voice command includes at least one of: a flight display control command, a flight management system control command, a chart recall command, a radio tuning command, a format change command, a checklist entry command, an aircraft system command, a switch control command, a menu control command, a natural language command, a macro command, and a contextual command.

* * * * *